(No Model.)

W. M. HINMAN.
PNEUMATIC CASH CARRIER APPARATUS.

No. 395,141. Patented Dec. 25, 1888.

WITNESSES
Percy Bryant
C. E. Nichols

INVENTOR.
William M. Hinman
per Edwin W. Brown
Attorney

UNITED STATES PATENT OFFICE.

WILLIAM M. HINMAN, OF BOSTON, MASSACHUSETTS, ASSIGNOR, BY DIRECT AND MESNE ASSIGNMENTS, TO THE METEOR DESPATCH COMPANY, OF PORTLAND, MAINE.

PNEUMATIC CASH-CARRIER APPARATUS.

SPECIFICATION forming part of Letters Patent No. 395,141, dated December 25, 1888.

Application filed January 26, 1888. Serial No. 261,986. (No model.)

*To all whom it may concern:*

Be it known that I, WILLIAM M. HINMAN, of Boston, in the county of Suffolk and State of Massachusetts, have invented certain new and useful Improvements in Pneumatic Cash-Carrier Apparatus, of which the following is a full, clear, and exact description.

This invention relates to improvements in cash-carrier apparatus in which pneumatic tubes are used for the transmission of cash-carriers or other articles therethrough.

The invention consists in the combination, with a pneumatic tube suitably arranged and adapted for the transmission of a carrier or other article therethrough by means of an air exhaust or pressure apparatus in suitable connection therewith, (said tube having an opening at any desired point or place in its side for the delivery thereat of a carrier or other article,) and a valve arranged to move back and forth within said tube to open and close said opening, (and operated by the exhaustion or pressure of air as the carrier, &c., makes connection therewith to move away from and open said opening and bring the carrier or other article opposite thereto for its delivery thereat,) of mechanism operated by the valve as it is moved away from said opening to act upon the carrier when it arrives opposite said opening to move or force or push it out of said tube at such opening, all substantially as hereinafter fully described; and the invention also consists in the combination, with a pneumatic tube suitably arranged and adapted for the transmission of a carrier or other article therethrough by means of an air exhaust or pressure apparatus in suitable connection therewith, (said tube having an opening at any desired point or place in its side for the delivery thereat of a carrier or other article,) and a valve arranged to move back and forth within said tube to open and close said opening, (and operated by the exhaustion or pressure of air as the carrier or other article makes connection therewith to move it away from and open said opening and bring the carrier or other article opposite thereto for its delivery thereat,) of an abutment, stop, or shoulder suitably supported in position for the carrier as it arrives opposite the delivery-opening in the tube to abut or strike against it and be forced or pushed or moved off the valve-seat for its delivery at said opening, all substantially as hereinafter fully described.

Figure 1:
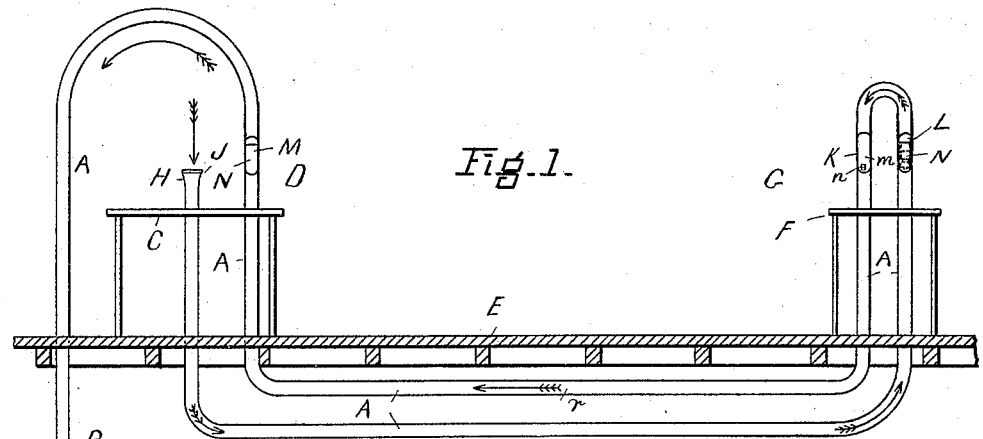
Figure 2:
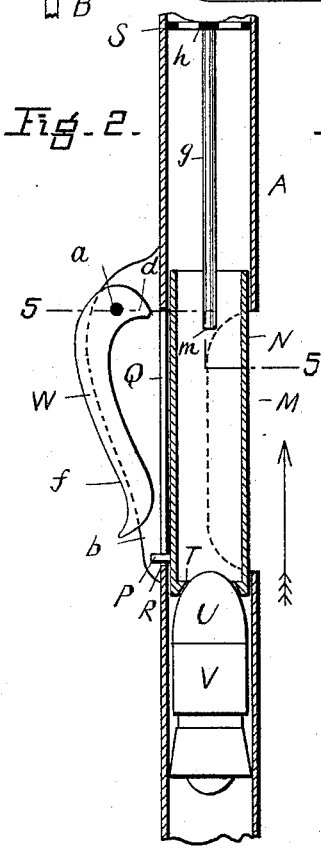
Figure 3:
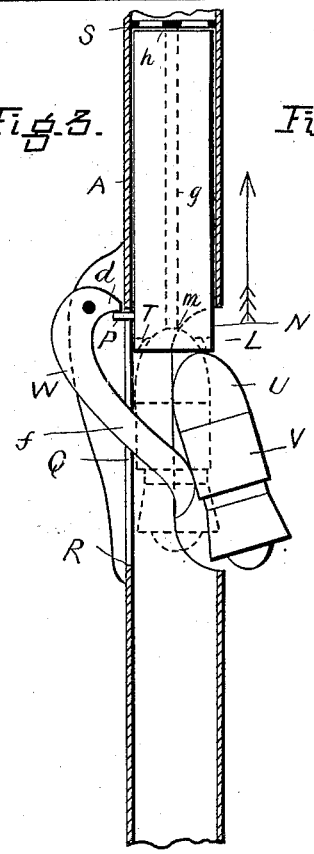
Figure 4:
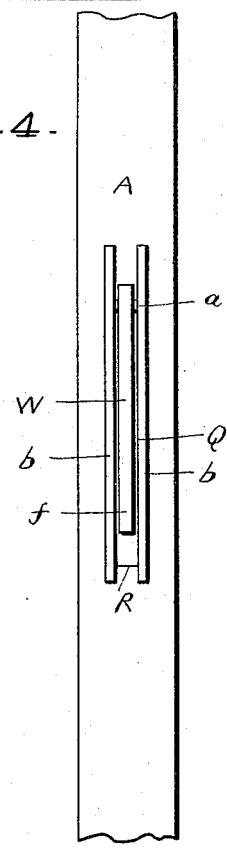
Figure 5:
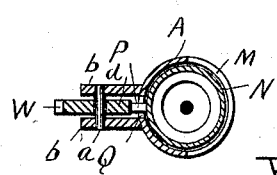

In the drawings is illustrated in Figure 1 a pneumatic tube between and connecting two stations for the trasmission therethrough from one station to the other, and vice versa, of a carrier or other article arranged for operation by means of an air-exhausting apparatus; Figs. 2 and 3, detail longitudinal central sectional views from front to rear of the pneumatic tube at one of the delivery-openings, Fig. 2 showing the valve closed, and Fig. 3 as opened and the carrier as forced or pushed out at said opening; Fig. 4, a rear view of Fig. 2, and Fig. 5 a cross-section on line 5 5, Fig. 2. Figs. 2, 3, 4, and 5 are enlarged.

In the drawings, A represents a pneumatic tube for the transmission of a carrier or other article therethrough, and to be connected at its end B to any suitable air-exhaust apparatus, not needing to be herein shown or described. The tube extends therefrom to the table C at the station D, thence down through the same and below the floor E, to and up through the same and a table, F, at the other station, G, and then returns down through the table F and back through the floor and the table C at station D, where it terminates in a vertical position, having its end H open and preferably flaring, all substantially as shown in Fig. 1 in side elevation.

The tube A has two receiving-openings for the reception of a carrier or other article to be transmitted through the tube, one, J, being the open end H at station D, and the other, K, at the station G, and two outlet or delivery openings, L M, in the front side of the tube A, respectively, at stations G and D, for the delivery from the tube of a carrier or other article transmitted through the tube from one of the receiving-openings.

Each of the outlets or delivery-openings L M has a valve, N, and the description of the construction, arrangement, and operation of one will answer for both, one being a duplicate of the other, and such opening and the construction and arrangement of its valve are shown in Figs. 2 to 5.

The openings K, L, and M are made in the front side of the tube in any suitable manner, and each is of a length and width for the carrier to be easily inserted or removed from the tube at each opening.

The valve or gate N is made in the present instance of a short tube open from end to end, its external diameter fitting closely the internal diameter of the tube A, but so it can freely slide back and forth or up and down in said pneumatic tube and yet maintain a close fit within the pneumatic tube, to substantially prevent air from passing between the two, and it is of a length when opposite its opening in the pneumatic tube to extend each way a short distance above and below the opening, to practically close the opening to the escape of air therefrom or entrance thereto, as shown in Fig. 2. The valve has a pin, P, projecting therefrom and through a longitudinal slot, Q, in the tube A, and when the valve is in its normal position over and closing its opening, as shown in Fig. 2, the valve, by its pin P, rests upon the lower end, R, of the slot, and when in its highest position, as shown in Fig. 3, the valve abuts against the flange or shoulder S of the tube, by which the valve is limited in its downward and upward or closing and opening movements. Its lower end is shaped to form a seat, T, which is of a construction to receive the end U of the carrier V—in the present instance circular in cross-section, as shown in Fig. 2—to close the same to the passage of air through the valve.

The operation so as far as has been described is as follows: The air-exhausting apparatus having been put in operation by its connection with the pneumatic tube, at its end B acts to draw or suck air from and through the tube A in the direction of the arrows shown in Fig. 1 and in Figs. 2 and 3. The carrier V is then, for instance, placed in the opening J at the flaring end H of the pneumatic tube at the station D, its pointed end downward, when from the action of the air-exhausting apparatus it will pass along the pneumatic tube until it arrives at the outlet or opening L at the other station, G, where it makes by its end U a close union with the seat T of the valve N. The valve then moves with it, because of the closing of the lower end of the valve by the carrier to the passage of air therethrough along the pneumatic tube until the valve is stopped by its abutment against the flange or shoulder S, the valve then being away from the opening L and the carrier opposite thereto, as shown in Fig. 3 in dotted lines, the opening being free and clear for the carrier to be then removed from the tube at such opening.

The invention thus far described in its construction and operation is the subject of a pending application for Letters Patent of J. L. Given, filed November 22, 1887, Serial No. 255,900, and its operation is such that when the carrier arrives at and is opposite to the delivery-opening, as shown in Fig. 3 in dotted lines, the valve then being open, the continued operation of the air-exhaust apparatus tends by its suction to hold the carrier to its seat on the valve, and thus prevents its discharge of itself at the delivering-opening, requiring more or less force to remove it therefrom; and the object of the present invention is to act upon the carrier at such time, so that it will as soon as it arrives at the delivery-opening be automatically released from the valve-seat and forced or moved out at the opening onto the table, or into any suitable receptacle, and this is accomplished as will now be described.

W is a lever pivoted at $a$ between two upright projections, $b$ $b$, on the back of the pneumatic tube A, and opposite to and in longitudinal plane with the slot Q.

The short arm $d$ of the lever W is in position when at rest for the valve, by its pin P, when opened, as hereinabove described, to abut and strike against it on its under side, which causes the lever to swing upon its pivot $a$, and thus its other or larger arm, $f$, to move through the slot Q into the tube A, as shown in Fig. 3, and if the carrier is then opposite the opening to strike against the side of the carrier V and cause it to break connection with the valve-seat T and move and fall out of the tube at the opening, as shown in Fig. 3. As the pressure of air behind the carrier holds it to its seat upon the valve, having a tendency to more or less interfere with the operation of the lever W, other and additional means are provided to force the valve from its seat, as follows:

In Figs. 2 and 3, $g$ is a central longitudinal rod or bar rigidly secured by one end to a cross-bar, $h$, of the flange or rim S in the tube, and projecting downward therefrom for its free end $m$ to be in position when the valve is opened and the carrier has arrived at the opening L or M, for the carrier by its forward end, U, to abut or strike against it, and as the valve moves upward the rest of its allowed movement the carrier will be detached or moved from the valve-seat T, so that air can pass between it and the valve-seat and through the valve, relieving substantially the air-pressure upon the carrier, so that then the action of the lever W on the carrier will easily cause the carrier to move out of said opening, automatically insuring the release of the carrier from its valve and its delivery from the opening.

As soon as the carrier is removed from the tube at the opening L it leaves the seat end of the valve open and free for air to pass through the valve, which will then fall by its gravity to its position in front of the opening, resting by its pin or shoulder P upon the lower end of the slot, as shown in Fig. 2, and close the opening to air entering or leaving the tube to interfere with the proper operation of the exhaust apparatus on the pneumatic tube in the transmission of a carrier therethrough, and the lever then returns by the gravity of its longer arm to its normal position, (shown in Fig. 2,) ready for operation again on a carrier when the valve is raised and opened, as described.

When desirous of returning the carrier from the station G to the station D, place the carrier in the opening K, which is closed by a valve, *m*, like the valve N, except that it has no seat T, the valve being opened by taking hold of its knob or handle *n* and raising it, then inserting the carrier, point downward, and closing the valve, which will fall by its gravity, it having a suitable rest for its proper position to close the opening K, when by the operation of the air-exhaust apparatus the carrier will move along the portion *r* of the tube and be delivered at the outlet or delivery opening M in the same manner that it is delivered at the opening L.

Either the lever W or the stop or abutment *g* for the valve can be used alone without the other; but it is preferable to use both, especially if the exhaustion of the air is very effective; also, the lever can be arranged to return to its normal position by a spring, but by gravity is preferable; also, the working of the lever is not limited to the particular means herein described of operating the valve, as is obvious, and the valve can be operated by any suitable air-pressure apparatus. It is most satisfactory in its results, however, when operated by an exhaust apparatus.

Having thus described my invention, what I claim is—

1. The combination, with a pneumatic tube for the transmission therethrough of a carrier or other article, provided with an opening or outlet for the delivery thereat of the carrier or other article, and a valve arranged to move back and forth to open and close said opening, of an arm or lever pivoted to a suitable support in position to be acted upon by the valve as it is opened or moved from over the opening in the tube, for the purpose specified.

2. The combination, with a pneumatic tube for the transmission therethrough of a carrier or other article, provided with an opening or outlet for the delivery thereat of the carrier or other article, a longitudinal slot, and a valve arranged to move back and forth to open and close said opening, of an arm or lever pivoted to said tube in position to be acted upon by the valve as it is opened or moved from over the opening in the tube, and arranged to extend through said slot to strike or abut against the carrier or other article, for the purpose specified.

3. The combination, with a pneumatic tube for the transmission therethrough of a carrier or other article, provided with an opening or outlet for the delivery thereat of the carrier or other article, and a valve arranged to move back and forth to open and close said opening and adapted to receive the carrier or other article, of a stop or abutment secured to a suitable support in position for the carrier to strike or abut against the same and be forced from its seat on the valve as the valve is opened or moved from over said opening.

4. The combination, with a pneumatic tube for the transmission therethrough of a carrier or other article, provided with an opening or outlet for the delivery thereat of the carrier or other article, and a valve arranged to move back and forth to open and close said opening and adapted to receive the carrier or other article, of a central longitudinal rod or arm, *g*, secured within the tube and projecting therefrom in position for the carrier to strike or abut against the same and be forced from its seat on the valve as the valves move from and open said opening.

5. The combination, with a pneumatic tube for the transmission therethrough of a carrier or other article, provided with an opening or outlet for the delivery thereat of the carrier or other article, and a valve arranged to move back and forth to open and close said opening and adapted to receive the carrier or other article, of a stop or abutment secured to a suitable support in position for the carrier to strike or abut against the same and be forced from its seat on the valve, and a lever pivoted to a suitable support in position to be acted upon by the valve as it is opened or moved from over said opening, for the purpose specified.

In testimony whereof I have hereunto set my hand in the presence of two subscribing witnesses.

WILLIAM M. HINMAN.

Witnesses:
   EDWIN W. BROWN,
   PERCY BRYANT.